Jan. 31, 1956  B. B. BAUER  2,732,757
PHOTOMETRIC APPARATUS
Filed June 12, 1951
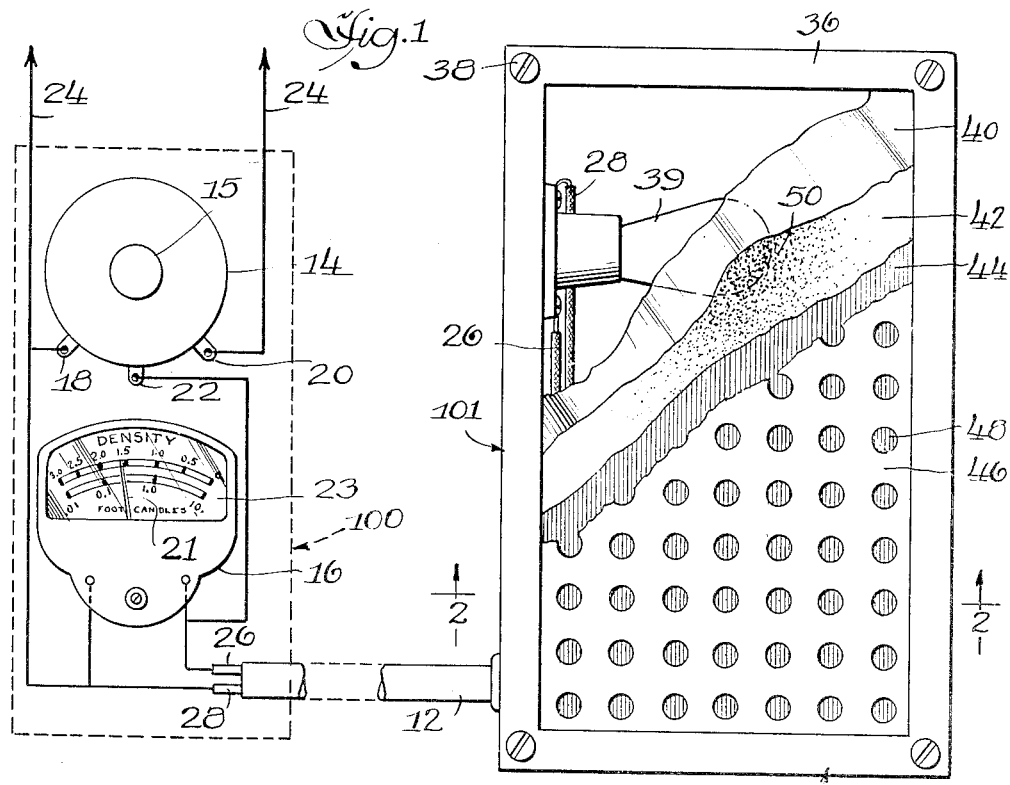
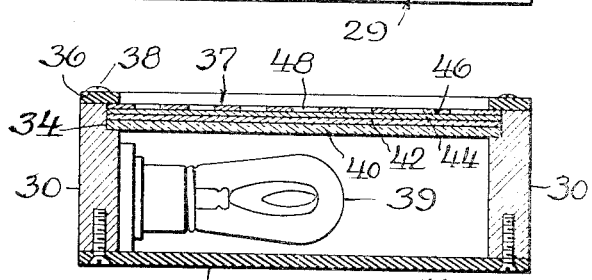
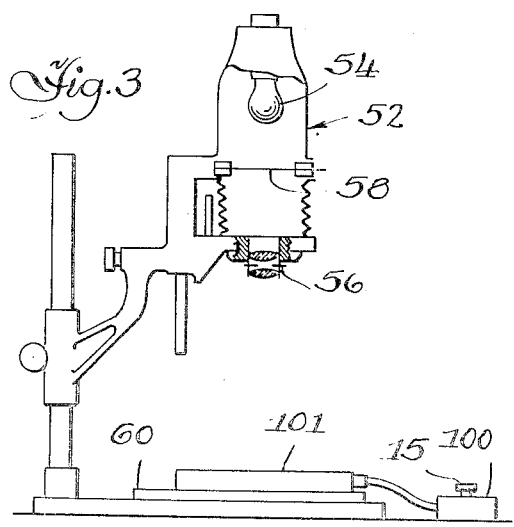
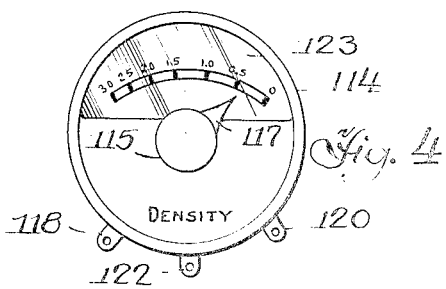
Inventor
Benjamin B. Bauer,
By: Jones, Leach & Darbo

United States Patent Office 2,732,757
Patented Jan. 31, 1956

2,732,757

PHOTOMETRIC APPARATUS

Benjamin B. Bauer, Oak Park, Ill.

Application June 12, 1951, Serial No. 231,205

5 Claims. (Cl. 88—23)

This invention relates to improvements in photometric apparatus of the comparison type, intended principally for use in photographic projection printing. It relates particularly to apparatus for determining the suitable sensitivity or contrast grade of photographic printing paper and also the suitable exposure time for making a print. The apparatus is also adapted for making an analysis of the projected image of a photographic negative, as the image projected by a photographic enlarger. It is also adapted for making a comparison of the intensities of illumination from two sources, and making a quantitative measurement of the intensity of light from an unknown source.

Photometric apparatus for comparing the intensity of illumination from two sources of light which have been known previously have generally been of the "grease-spot" type, comprising usually a sheet of paper or a like material having a small area or spot thereof treated so as to be translucent. A controlled source of light is arranged behind the sheet and the illumination to be measured is projected upon the front side of the sheet. The sheet is observed and at the same time the intensity of illumination from the controlled source of light is adjusted until the translucent spot becomes most nearly invisible, that is, merges visually into the remainder of the sheet. The intensity of illumination on both sides of the sheet is then considered to be approximately equal. Photometric apparatus of this type is relatively insensitive when used with low levels of illumination.

In the improved photometric apparatus of the present invention a grease-spot of the character described is not used, but instead there is provided a light-transmitting, quasi black body, that is, a body which is not an ideal black body but one which is of fairly dense blackness and absorbs a large proportion of the light incident upon its dark surface and transmits a substantial proportion of the light incident upon the opposite surface. The light to be compared is directed against the opposite sides of such body. It has been found that such an apparatus exhibits high sensitivity at extremely low levels of illumination and is a marked improvement in this respect over the previously known apparatus.

The photometric apparatus known heretofore has been provided with a single grease-spot, and when this is used for the analysis of the projected image of a photographic negative to determine the intensity of illumination at the brightest and darkest points of the image (highlights and shadows), or the relative intensity over the area of the image, such an apparatus requires a laborious point-by-point exploration of the image with the grease-spot.

In the apparatus of the present invention a plurality of quasi-black bodies of small area is provided distributed over a relatively large area. In such apparatus the laborious point-by-point exploration is not required and the location of the points of greatest brightness and darkness and the relative intensity of the illumination thereof and of any other desired points upon the image may be determined with precision and ease and without any manipulation other than the adjustment of the intensity of a controlled light source.

It is one of the objects of the invention to provide a photometric apparatus which is simple and economical in construction and is also simple and convenient to operate.

Another object of the invention is to provide a photometric apparatus possessing a high degree of sensitivity and capable of quickly and accurately determining upon a projected photographic image the locations of the darkest and the brightest areas and the relative intensity of illumination at such areas or at any other area thereon.

Another object is to provide a photometric apparatus of the character described which is adapted to facilitate the selection of the most suitable material for the photographic positive, that is, the material having the optimum exposure latitude for bringing out the highlights and shadows of the particular negative being printed.

Another object is to provide an improved apparatus for determining the relative intensity of the illumination from two light sources, and also for determining quantitatively the intensity of illumination from an unknown light source.

Briefly, the apparatus of the invention comprises a photometric screen the main portion of which is opaque and has a reflecting front surface. Distributed over the area of the screen are local areas or spots which are translucent and at which a quasi-black body is exposed to the front. A source of light of adjustable intensity is provided behind the screen, which will be called the internal source, or light. The light to be measured, or the image of the photographic negative which is to be analyzed, is projected upon the front of the screen and by simple adjustment of the internal light the desired information is determined.

In the apparatus of the present invention where the internal illumination is transmitted to a plurality of small, translucent quasi-black body areas distributed over a relatively large area there is a tendency for the illumination to be non-uniform. It is a further object of the invention to provide a photometric apparatus in which this non-uniformity is compensated for and relatively uniform illumination is provided at all of the small black body areas with the result htat the apparatus is capable of highly accurate measurements.

Other objects and advantages will become apparent as the following description progresses, which is to be read in conjunction with the accompanying drawings in which:

Fig. 1 is a partly schematic plan view of an embodiment of the photometric apparatus of the present invention, with parts thereof broken away to show internal structure;

Fig. 2 is a sectional view taken along line 2—2 of Fig. 1 with the schematically shown part omitted;

Fig. 3 is a view illustrating the use of the apparatus with a photographic enlarger, and Fig. 4 is a schematic view of a modification showing adaptation of the rheostat in the energy supply line for indicating density of the photographic negative.

The embodiment shown in Figs. 1 and 2 is composed of two parts designated generally by the numerals 100 and 101. The part 100 is a control unit for controlling the internal illumination, which is adapted for manual adjustment by the operator and for providing a reading of the intensity of illumination. The unit 101 is the photometric unit proper. The control unit is illustrated schematically because the physical structure and arrangement of its parts are of no special significance, and the various basic elements of which it is composed are well known to the art. The unit 100 may be contained in a housing (not shown) separate from that of unit 101, as indicated in Fig. 1, and electrically connected to the unit 101 by means of suitable conductors carried in the cord 12, or if desired unit 100 may be enclosed in the same housing with the unit 101.

The control unit 100 consists of a rheostat 14 and a voltmeter 16. The rheostat is of the conventional adjustable potentiometer type, a unit capable of continuously dissipating 50 watts of energy being suitable. The rheostat has a knob 15 for adjusting the output voltage, a terminal 18 which serves as both an input and output terminal, and cooperating input terminal 20 and output terminal 22. The input terminals 18 and 20 are connected to a suitable energy supply 24, which may be an ordinary 110 volt alternating current supply line. The output terminals 18 and 22 are connected to the terminals of the voltmeter 16 and also to the conductors 26 and 28 which are contained in cord 12 and supply energy to the photometric unit 101. The voltmeter 16 has the usual indicating pointer 21, and other details of the voltmeter for adapting it for the purposes of the present invention will be described hereinafter.

The photometric unit 101 comprises a housing 29 of any convenient size and shape, a rectangular housing 6" long x 4" wide and 1¼" deep being suitable. The housing is made up of side members 30 which enclose the four sides of the unit, and a bottom member 32 suitably fastened to the side members. The side members have a longitudinal recess 34 in the upper interior portion thereof to receive the edge portions of several parts presently to be described. An open frame or clamping member 36 rests against the upper edge of the side members 30 and is removably held in place by suitable means, such as the screws 38. The member 36 extends inwardly a sufficient distance to suitably clamp in position the parts received in the recess 34. The housing 29 with the clamping member 36 forms an open-top rectangular receptacle and the parts to be described hereinafter form a photometric screen which extends across the open top of the receptacle and is indicated generally by the numeral 37.

Suitably mounted within the housing and beneath the photometric screen 37 are one or more lamps 39 which are suitably connected to the supply conductors 26 and 28 and serve as the source of internal illumination for the photometric unit 101. In an oblong housing such as have been specifically described, it is preferred to employ several lamps, for example, two or three. In a square housing of smaller dimensions a single lamp may be sufficient. By way of illustration and not of limitation, lamps having a rating of 6 watts at 110 volts have been employed with success. The voltage, and consequently the energy, supplied to the lamps 39 is varied by turning the adjusting knob 15 of the rheostat 14. In the embodiment illustrated in Fig. 1, the voltage is increased as the knob is turned in a clockwise direction and the lamps 39 are de-energized when the knob is turned to its maximum counter-clockwise position. The voltage supplied to the lamps may be read on the voltmeter 16, or the voltmeter may be calibrated to read directly in light values as will be described hereinafter.

The lower member of the photometric screen 37 is a sheet or plate 40 of transparent or preferably translucent supporting material which may be of clear or frosted glass. The next element, proceeding upwardly, is a sheet of photographic positive paper 42 which has been incompletely exposed and then developed and fixed in a manner which will be explained hereinafter. Sheet 42 transmits a substantial proportion of the light from the internal source 39 and is translucent. Sheet 42 is caused to be of non-uniform darkness to at least partially compensate for the unevenness of the internal illumination of the photometric screen 37 over the area thereof, as will be described hereinafter. The next member 44 is a second sheet of photographic positive paper which has also been exposed, developed and fixed, to provide a quasi black body of relatively low light reflectivity, which also transmits a substantial portion of internal illumination. Sheet 44 may also be of non-uniform blackness to further compensate for unevenness of internal illumination. The next and uppermost member of screen 37 is a sheet of opaque material 46 having a large number of apertures 48 distributed over the area thereof. Member 46 may be composed of any suitable substantially opaque material having an exposed surface having relatively high light reflectivity, such as metal, heavy bristol board or the like. The members 42, 44 and 46 will be described more in detail hereinafter.

The sheet 42 is prepared as follows. The instrument, assembled as described with the exception that the members 42, 44 and 46 are omitted, is placed in a suitably darkened location with the internal light source 39 de-energized. A sheet of unexposed photosensitive material, such as photographic positive paper, is placed on the translucent support 40 with the sensitive surface facing upward. A thin sheet having a relatively high coefficient of light transmission and a medium contrast grade is preferred. The sheet is then partially exposed by the internal source 39. By way of example, to do this the control knob of rheostat 14 is turned clockwise until a substantial amount of energy is supplied to the light source 39, for example, at approximately 80 to 90 volts. The exposure of the sheet is continued for a few seconds and then stopped, which is well before the sheet is completely exposed. The sheet is then developed, fixed and dried in the usual manner. A sheet so treated is unevenly darkened, the darkness at a particular area being in direct proportion to the intensity of internal illumination at that area.

Exposure is preferably controlled so that the color varies from black or a deep gray tone at those areas closest to the lamps 39, indicated by the shaded area 50 in Fig. 1, to an almost white color at the areas most remote from the lamps.

After the sheet 42 has been developed, fixed and dried, it is tested to see if it provides the desired compensation. For this purpose, it is again placed upon the supporting sheet 40 and the lamps 39 are energized at substantially the full voltage of the supply line 24. The darker areas of the sheet offer greater resistance to the passage of light, and since these occur at the areas of greater intensity of illumination, the ultimate result is that the intensity of the light passing through the sheet is relatively uniform over its entire surface. The object is to provide a substantial amount of compensation while introducing a minimum amount of resistance to light passage at those areas where the illumination from the lamps 39 is at a minimum. It is preferred that little or no resistance, or darkening of sheet 42, occurs at those areas. The obtaining of the desired overall result depends on three factors; the degree of sensitivity of the paper or the rapidity with which the paper darkens upon exposure to a given quantity of light; the intensity of illumination, and the time of illumination. These factors are determined by experiment, that is, the operator selects the positive paper from among papers having different contrast grades, the voltage applied to lamps 39, and the length of time the energy is applied to the lamps. This is very readily done and an ordinary person is able to obtain the desired result with little difficulty.

The second sheet 44, which is a combination quasi-black body and compensating sheet, is then prepared in a manner generally similar to that just described. In a darkened room, with the lamps 39 de-energized and the first sheet 42 in position upon the supporting sheet 40, the sheet 44 is placed upon the sheet 42 with the unexposed photosensitive surface facing upward. The lamps 39 are then energized and the sheet exposed for a number of seconds, after which it is developed, fixed and dried. The time of exposure is adjusted by experiment to be such that the entire surface is dark and its lightest areas are of a tone no lighter than a dark gray. It is preferred that all areas of the sheet 44 have a reflection coefficient of about 0.5 or less. Paper having a coefficient of 0.1 or less has been used an provides great sensitivity in the instrument. Such a surface is substantially non-reflecting. Paper having a coefficient as low as .01 has been used with success. The tone of sheet 44 is preferably not quite uniform, that is, the exposure described above is stopped before the sheet becomes completely black. In this way, differences in darkening or color are provided which further compensate for any non-uniformity in the illumination coming from the lamps 39 through the first sheet 42. After the described processing, the sheet 44 is again placed in position upon sheet 42, and the apertured reflecting sheet 46 is placed upon sheet 44, and the clamping member 36 is fastened in place. The sheets 42 and 44 cooperate to provide a member which has relatively low reflectivity with respect to light from an external source and which transmits light of relatively uniform intensity over its area from the internal source 39. The portions of sheet 44 which are exposed through the apertures 48 in the sheet 46 are distributed small quasi-black bodies having uniform light reflection and emission properties as described.

As stated heretofore, the sheet 46 is substantially opaque and has a relatively light-reflective upper surface. Preferably such surface has a light reflecting coefficient of 0.5 or greater, and substantially greater than that of sheet 44. It is preferred that the upper surface of sheet 46 have a reflection coefficient at least twice as great as that of the corresponding surface of the uppermost light transmitting sheet 44. Preferably also, it has a matte surface whereby the reflected light is diffused and glare is avoided. The surface may be of any suitable bright color. It is desirable that the reflecting surface have a color similar to that of the light issuing from the lamps 39 to avoid inaccuracies of measurement due to differences between the color of light reflected from the sheet 46 and that transmitted from the lamps 39. Yellow and orange are very satisfactory where lamps 39 are of the incandescent type because the light from such lamp is somewhat yellowish in character, especially when the intensity of illumination is low. As a further expedient to avoid color differences, the supporting sheet 40 may be of a bluish color, as for example, it may be composed of blue filter glass. In such case, the yellowish tint of the light from lamp 39 is largely eliminated and the sheet 46 may have a white reflecting surface. Also, where the light to be measured or analyzed is other than white the sheet 40 may be of a corresponding color.

The apertures 48 in the sheet 46 may be of any desired size and shape and spaced any desired distance apart. Very satisfactory results have been obtained with circular openings approximately ⅛" to ¼" in diameter spaced apart ¼" to ½" on centers.

The operation of the instrument is on the principle that the reflection coefficient $k_1$ of the sheet 46 is relatively high, while the reflection coefficient $k_2$ of the sheet 44 at the apertures 48 is relatively low. As explained heretofore, it is preferred that the ratio of $k_1$ to $k_2$ be 2 to 1 or greater. Therefore, with the internal source 39 de-energized, external light of any intensity falling upon photometric screen 37 will result in the reflecting surfaces of sheet 46 appearing bright and the apertures 48 appearing relatively dark. The same is true with internal source 39 energized, when the external light reflected by sheet 46 is of greater intensity than the light emitted at the apertures 48, by transmission from the internal source 39 through sheets 42 and 44 and reflection of external light by sheet 44. However, if the intensity of illumination from the internal source is increased until the light emitted at apertures 48 equals the external light reflected by the surfaces of sheet 46 the apertures 48 become substantially invisible. If the intensity of light from the internal source is increased still more, the intensity of the light issuing from the apertures 48 exceeds that of the light reflected from the surfaces of sheet 46, and the apertures stand out bright in a relatively dark field. By manipulation of the rheostat knob 15, it is simple to find the point of light balance where the apertures 48 are invisible or nearly so. For any given intensity of external light impinging upon the screen 37 there is a single setting of knob 15 which produces light balance.

Before describing the operation of the device, it is desired to state that a single quasi-black body sheet may be used in place of the two sheets 42 and 44. In such case, the sheet is prepared as described above in connection with sheets 42 and 44, the kind of paper and the exposure conditions being controlled so as to provide low reflectivity and compensation for unevenness of internal illumination. Such a sheet usually does not provide as high a degree of compensation as does the combination of sheets 42 and 44, but may be satisfactory where the requirements for compensation are not highly exacting. Likewise, where the requirements are very great more than two compensating sheets may be used, with the topmost sheet having low reflectivity as previously described for sheet 44.

The sheet or sheets beneath apertured sheet 46 provide a member having an exposed surface having lower light reflectivity than does the exposed sheet 46, which member has a coefficient of light-transmission which varies over the area thereof in a manner substantially inverse to the variation of the intensity of the light incident thereon from the internal source 39 whereby said member emits internal illumination of more or less uniform intensity over its area. Said member cooperates with the apertured sheet 46 to provide a photometric screen 37 which is substantially opaque and has relatively high light reflectivity over the major portion of its area and has distributed local areas or spots which are light transmitting and have relatively low light reflectivity.

In the operation of the instrument, the photometer is first calibrated. The voltmeter has a dial 23 and the dial is calibrated to provide two scales, the first indicating intensity of illumination upon the photometric screen 37 and being labeled "foot-candles" and the second indicating resistance to light transmission, or the density or degree of opacity of the photographic negative being printed, and being labeled "density" in Fig. 1. Calibration is conducted as follows. In a darkened room, a standard lamp emitting light of a known intensity is placed at a known distance above and perpendicular to the photometric screen 37, whereby illumination of known intensity, say 10 foot-candles, is incident upon said screen uniformly over its area. The lamps 39 are then energized and the knob 15 of the rheostat 14 is adjusted until to an observer located forwardly of the screen 37 the apertures 48 just become invisible. All of the apertures become invisible at substantially the same time. The arrangement and conditions are preferably such that the lamps 39 under these circumstances are energized substantially the maximum amount, that is, knob 15 is substantially at or near its extreme clockwise position and the pointer 21 of the voltmeter is at or near its maximum position. A mark "10" is then placed upon the foot-candle scale of dial 23 at this position of the pointer 21. At the same time a second mark with the notation "0" is placed at the same position of the pointer 21 upon the density scale of dial 23. The value of 0 for density is chosen arbitrarily but since illumination is at a maximum value, it may conveniently be caused to represent the resistance to light transmission when the negative is absent or substantially transparent when the device is used with an enlarger, as will be clear as this description progresses.

For establishing the next point in the calibration of the instrument, the standard light source described heretofore is moved to a location perpendicular to the screen 37 and at a distance therefrom equal to $\sqrt{10}$ times the former distance, thereby producing uniform illumination incident upon the screen of an intensity one-tenth that used for the first calibration setting. The knob 15 of the rheostat 14 is again adjusted by moving it in a counter-clockwise direction to reduce the intensity of light from the lamps 39 until the apertures 48 become invisible. The location of the pointer 21 is marked upon the two scales of dial 23. The foot-candle scale is marked "1.0" because the intensity of illumination is one-tenth that of the former value. The density scale is marked "1.0" because the density of a photographic negative is by definition the negative logarithm of the relative light transmission property or transparency thereof, with 0 representing total transparency. The light incident upon screen 37 having been reduced to one-tenth of its former value, the condition is equivalent to the insertion of a photographic negative which interposes ten times the resistance to light transmission as was present at the first setting. The value 0 being arbitrarily chosen for the first setting, the value 1.0 is proper for the second setting.

The third set of points on the scales of dial 23 are determined in a similar manner, namely, by first moving the standard light source to a position ten times the distance from the screen 37 used for determining the first point. The rheostat knob 15 is then adjusted counter-clockwise until the apertures 48 again disappear and a mark and notation of "0.1" are placed upon the foot-candle scale of dial 23, and mark and notation of "2.0" are placed upon the density scale of dial 23. In the same way, additional marks are determined and placed upon the dial to provide intermediate values within the range which it is contemplated that the instrument will cover. The scales are shown in Fig. 1 as covering a foot-candle range of .01 to 10 and a density range of 0 to 3.

To use the device as a comparison photometer to measure the intensity of light from an external unknown source, the external light is projected upon the screen 37 and the knob 15 adjusted until the apertures 48 just disappear. In such case the external illumination will usually be uniform over the area of the screen and all of the apertures will disappear at the same time. The reading upon the foot-candle scale is a quantitative measurement of the intensity of the external light incident upon the screen and, if desired, the intensity at the light source itself can be determined by known methods.

The instrument can be used to compare the intensities of two sources by testing them in the manner described. Also, the comparative intensities of light from any two sources can be determined by placing the photometric screen 37 between them and observing the screen from the front. Many other uses for light intensity measurement and comparison and for analysis of light patterns will be suggested by the foregoing, and they will not be enumerated herein.

The use of the device for projection printing will now be described. As the first step, it is desirable to determine, in terms of density values of the instrument, the exposure latitude of the various photographic positive papers which it is desired to use. The procedure for determining exposure latitude is known generally to the art, but will be described in connection with the present instrument. In a darkened room a known source of light, which may be the standard source of light described heretofore or the light source of a photographic enlarger, is arranged above the screen 37 a suitable distance. The use of the enlarger 52 will be described. Photographic enlargers are well known and enlarger 52 will not be described in detail. The photometric unit 101 is placed on the base or easel 60 of the enlarger. The lamps 39 are then fully energized, that is, the knob 15 of the rheostat 14 is turned to the position in which a density reading of 0 is obtained upon voltmeter 16. Without any photographic negative in the enlarger, the light source 54 of the enlarger is energized and the intensity of the illumination therefrom incident upon the photometric screen 37 is adjusted, by manipulation of the lens diaphragm 56 of the enlarger, until the apertures 48 disappear. The light source 54 should, of course, have sufficient energy to accomplish this result. In this operation the illumination upon the sheet 46 is uniformly distributed and the apertures 48 all disappear at the same time. Employing this amount of illumination from the enlarger and with the lamps 39 de-energized, a specimen of the photographic positive paper to be tested is placed in the position previously occupied by the photometric screen with the sensitive surface upward and the minimum period of time is determined which is required to produce the deepest preceptible black tone upon the paper. In practice this is conveniently done by exposing specimens of the paper to the light for progressively increasing periods of time, followed by developing and fixing, until a period has been determined which is just sufficient to produce the deepest black tone. This period will be designated the "saturation speed" of the paper.

The next determination is the illumination, in terms of density of the negative, required to produce in the same length of time, that is, the time equal to the saturation speed of the paper, the first perceptible gray tone upon the same paper. This is conveniently accomplished by testing several specimens of the paper and adjusting the illumination from the enlarger and with each adjustment exposing the paper for the "saturation speed" period of time. When the illumination has been determined which produces the first noticeable gray tone in the paper in this period of time, the specimen of paper is removed, unit 101 is replaced in position on easel 60 and lamps 39 are energized and knob 15 is adjusted until the apertures 48 disappear. The density reading obtained by this operation will be substantially greater than 0 and may be used directly as the value of the exposure latitude of the paper. The exposure latitude is determined in this manner for the various grades of printing paper it is desired to use.

As an example of the above described determination, with an instrument such as has been specifically described heretofore, a photographic positive paper having a contrast grade No. 2 and commercially available under the trade mark "Kodabromide" acquired the deepest perceptible black tone when exposed for 20 seconds in accordance with the first operation described heretofore, and it acquired the first perceptible gray tone when a reading of 1.5 density was obtained in the second operation. In other words, the exposure latitude of this paper as determined by the instrument was 1.5.

In employing the instrument for photographic printing, the procedure is as follows. The negative 58 to be printed is placed in the negative carrier of the enlarger 52 and the projected image is focused upon the base or easel 60 of the enlarger. The unit 101 is placed upon the easel 60 with the screen 37 upward. The unit 101 is shallow and normally no adjustment of the focus is required to bring the latter to the sheet 46. The lamp 54 of the enlarger is energized and the knob 15 of the rheostat 14 is turned to the maximum value, namely, the value of 0 density. The lens diaphragm 56 of the enlarger is then adjusted until the apertures 48 disappear at the area corresponding to the lightest or most transparent portion of the negative. The remaining apertures appear lighter than the reflecting surface of sheet 46. With the lens diaphragm remaining stationary, the knob 15 is turned in a counter-clockwise direction until the last aperture or small group of apertures change from a light color to invisibility. In this setting, the light projected through the darkest portion of the negative is being balanced by the light transmitted from the lamps 39. The density reading of the dial 23 is taken at this setting, and this reading is a direct value of the density range of the negative. The photographic positive paper selected for making prints from this negative should have an exposure latitude substantially equal to the density range of the negative. It has been found that the best procedure is to select a paper having the largest exposure latitude encompassed within the density range of the negative or a range slightly greater than this.

After the appropriate photographic positive paper has been selected, to make a print thereupon it is placed on the easel 60 and with the enlarger at the same setting as last described heretofore, the image of the negative is projected upon the paper for a length of time substantially equal to its saturation speed. In this manner, the portions of the positive corresponding to the lightest portions of the negative will be very dark and in fact will be almost black, while those portions corresponding to the darkest portions of the negative will be very light, and in fact almost white. As a result, the full range of the positive paper is utilized and a well exposed, brilliant print is obtained. The exposure time may be varied from that described to obtain a contrast in the print to suit the tastes of the user or the nature of the photograph.

The invention provides a very simple and convenient apparatus and method for making photographic prints having the desired contrast, and also for obtaining a comparison of the intensities of illumination from two light sources. In addition to making a determination of the highlights and shadows of an image projected from a negative, the instrument enables one by the same procedure to determine the density at any portion of the image, that is, to make a complete analysis of the image.

The embodiment which has been described in the foregoing and the method whereby it is used are given by way of illustration and various modifications will occur to those skilled in the art. For example, the sheet 46 may be spaced above the sheet 44 instead of being adjacent thereto, and the device may be otherwise similar to that of Figs. 1 and 2. A spacing of ¼″ to ½″ is suitable.

In the embodiment described in which the apertured reflecting sheet is spaced from the relatively non-reflecting sheet, the under side of the reflecting sheet may be blackened to reduce internal reflection therefrom.

As further modifications, a single compensating sheet may be used in place of the two sheets 42 and 44, and it is possible to omit the two sheets and employ a single glass photographic plate in place of the member 40, such photographic glass carrying sensitive emulsion upon its surface as is well known. Such sensitive surface is arranged facing upward and is subjected to a treatment similar to that described heretofore in connection with sheet 42 to provide compensation for the inequalities of light transmitted therethrough from the lamps 39 and a suitable surface of low light reflectivity. Also, instead of producing the compensating sheet by a photographic exposure process, it may be produced mechanically by spraying or printing a dark pigment upon the surface of a light transmitting sheet in such manner that the amount of pigment deposit is greater at the area where the intensity of light from the lamps 39 is greater. The last expedient ordinarily will not produce compensation of as high quality as do the sheets 42 and 44 but it may be sufficient for the needs of the user.

Also, the foot-candle scale on dial 23 may be omitted if quantitative measurement of light intensity is not desired. Also, where the voltage of the supply line is substantially constant, the voltmeter 16 may be dispensed with and a dial may be placed upon the rheostat 14 and marked with values corresponding to those upon the dial 23 of the voltmeter. Such a rheostat, carrying a density scale only, is illustrated in Fig. 4. Said rheostat 114 has knob 115 and terminals 118, 120 and 122, corresponding to parts 15, 18, 20 and 22 of rheostart 14, and also has a pointer 117 attached to knob 115 and a dial 123 carrying a density scale in the same manner as does the dial 23 of the voltmeter 16. Density values may be determined and marked upon the dial 123 in the same manner as described heretofore in connection with the voltmeter 16.

It has been observed that in an arrangement as described, the density scale at the rheostat is approximately uniform, that is, the density values are approximately proportional to the angular rotation of the knob 15. Potentiometers can be so constructed, as by appropriate shaping of the winding, that the density values are very nearly proportional to the angular rotation. Likewise the density scale of the voltmeter 16 can be made uniform, as by appropriate shaping of the pole-pieces. Such expedients are useful when it is desired to provide the photometric device with a directly-coupled calculator. Calculators are known for use with photometric apparatus for the purpose of determining exposure times in a rapid manner. Such calculators may be used with the apparatus of the present invention.

Also, instead of employing a rheostat to regulate the intensity of illumination from lamps 39, said lamps may be energized at a constant voltage, and mechanical shutters or variable density optical wedges, which are well known, may be employed to regulate the intensity of internal illumination. In such an arrangement, suitable means may be provided to secure relatively uniform light intensity over the surface of the quasi-black body sheet at the different settings of the shutter. Such an arrangement for the adjustment of light intensity is generally well known and is considered to be the equivalent of the arrangement for varying voltage described heretofore.

Other modifications will occur to those skilled in the art and are intended to be embraced within the spirit of the present invention.

What is claimed is:

1. In a photometric device embodying the principle of visual light balance, a screen member having a side exposed for viewing purposes and for the reception of external illumination to be measured, said screen member having a plurality of spaced apart local light-transmitting areas, the remainder of said screen member being substantially opaque and diffusely reflective on said exposed side thereof, a source of illumination on the side of said screen member opposite said exposed side thereof, a translucent quasi-black body member on the side of said screen member opposite said exposed side thereof and having a surface thereof arranged for the reception of illumination from said source of illumination and exposed for viewing and the reception of external illumination through said light-transmitting areas, and means for adjusting the illumination of said exposed surface of said black body member by said source of illumination to achieve visual light balance between external illumination impinging on the reflective areas of said screen member and the illumination of the quasi-black body areas visible through said light-transmitting areas due to the sum of the illuminating effects thereon of the external illumination and the illumination from said source of illumination, the illumination of said exposed surface of said quasi-black body member due to said source of illumination being sufficiently uniform over the area thereof that with uniform external illumination said visual light balance is achieved substantially simultaneously at said visible quasi-black body areas.

2. Photometric apparatus as claimed in claim 1 in which the quasi-black body member has dark pigment distributed over the area thereof and contributing light absorption characteristics thereto.

3. In a photometric device embodying the principle of visual light balance, a screen member having a side exposed for viewing purposes and for the reception of external illumination to be measured, said screen member having a plurality of spaced apart local light-transmitting areas, the remainder of said screen member being substantially opaque and diffusely reflective on said exposed side thereof, a density filter adjacent to the side of said screen member opposite said exposed side thereof, surface areas of said density filter being exposed to external illumination through said light-transmitting areas, said density filter containing dark pigment and under the effect of external illumination only being dark in appearance relative to the exposed surface of said screen member, a source of illumination on the side of said density filter opposite to said screen member, and means for adjusting the illumination of said exposed surface of said density filter by said source of illumination to achieve visual light balance between external illumination impinging on reflective areas of said screen member and the illumination of said exposed surface areas of said density filter due to the sum of the illuminating effects thereon of the external illumination and the illumination from said source of illumination, the light emanating from said exposed surface areas of said density filter due to said source of illumination being sufficiently uniform for a given setting of said illumination adjusting means that with uniform external illumination said visual light balance is achieved substantially simultaneously at said visible areas of said density filter.

4. In a photometric device embodying the principle of visual light balance, a screen member having a side exposed for viewing purposes and for the reception of external illumination to be measured, said screen member having a plurality of spaced apart local light-transmitting areas, the remainder of said screen member being substantially opaque and diffusely reflective on said exposed side thereof, a translucent member adjacent to the side of said screen member opposite said exposed side thereof, surface areas of said translucent member being exposed to external illumination through said light-transmitting areas, a source of illumination on the side of said translucent member opposite to said screen member, said translucent member being a quasi-black body with respect to external illumination and a density filter with respect to illumination from said source of illumination, the illumination incident upon said translucent member due to said source of illumination being non-uniform, the density of said translucent member varying over the area thereof in such manner that the light emanating from the side thereof facing said screen member due to said source of illumination, in comparison with said illumination incident upon said translucent member due to said source of illumination, is relatively uniform over the area of said translucent member, and means for adjusting the illumination of said exposed surface of said translucent member by said source of illumination to achieve visual light balance between external illumination impinging on reflective areas of said screen member and the illumination of said exposed surface areas of said translucent member due to the sum of the illuminating effects thereon of the external illumination and the illumination from said source of illumination.

5. A photometric device as claimed in claim 4 in which the translucent member comprises a first sheet at the side of the screen member opposite the exposed side thereof and a second sheet at the side of said first sheet opposite said screen member, said second sheet being a density filter in which the density varies over the area thereof generally in proportion to the illumination thereof by the source of illumination such that the illumination by the source of illumination of the surface of said second sheet facing said first sheet is relatively uniform over the area thereof, and said first sheet having dark pigment distributed over the surface thereof facing said screen member whereby said surface constitutes a quasi-black body surface with respect to external illumination.

References Cited in the file of this patent

UNITED STATES PATENTS

| 712,346 | Turney | Oct. 28, 1902 |
| 1,297,260 | Sharp | Mar. 11, 1919 |
| 1,953,471 | Eich | Apr. 3, 1934 |
| 2,333,759 | Akelaitis | Nov. 9, 1943 |
| 2,435,074 | Fry | Jan. 27, 1948 |
| 2,625,852 | Van Orden | Jan. 20, 1953 |

FOREIGN PATENTS

| 499,052 | Great Britain | Jan. 18, 1939 |